United States Patent
Golusky et al.

(10) Patent No.: US 7,522,897 B2
(45) Date of Patent: Apr. 21, 2009

(54) ADAPTABLE DC OFFSET CORRECTION

(75) Inventors: John M. Golusky, Minneapolis, MN (US); Kelly P. Muldoon, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 364 days.

(21) Appl. No.: 11/246,044

(22) Filed: Oct. 7, 2005

(65) Prior Publication Data

US 2007/0082643 A1    Apr. 12, 2007

(51) Int. Cl.
*H04B 1/00* (2006.01)

(52) U.S. Cl. .................. 455/234.1; 455/296; 455/337

(58) Field of Classification Search .............. None
See application file for complete search history.

(56) References Cited

U.S. PATENT DOCUMENTS 6,654,593 B1 * 11/2003 Simmons et al. ......... 455/234.1
2005/0136874 A1 * 6/2005 Yeo et al. .................. 455/296

* cited by examiner

*Primary Examiner*—Thanh C Le
(74) *Attorney, Agent, or Firm*—Black Lowe & Graham PLLC

(57) ABSTRACT

Methods and systems for adaptable DC offset correction are provided. An exemplary adaptable DC offset correction system evaluates an incoming baseband signal to determine an appropriate DC offset removal scheme; removes a DC offset from the incoming baseband signal based on the appropriate DC offset scheme in response to the evaluated incoming baseband signal; and outputs a reduced DC baseband signal in response to the DC offset removed from the incoming baseband signal.

18 Claims, 3 Drawing Sheets

ADAPTABLE DC OFFSET CORRECTION

GOVERNMENT LICENSE RIGHTS

The U.S. Government may have certain rights in the present invention as provided for by the terms of NASA Cooperative Agreement no. J10730.

TECHNICAL FIELD

The present invention generally relates to digital communications and more particularly to DC offset correction.

BACKGROUND

In addition to a modulated signal component, baseband signals typically also comprise a DC offset which is introduced by hardware during the course of the baseband signal's transmission across a network. In order to accurately demodulate data from a digital baseband signal, this DC offset must be removed. Properties of the DC offset can vary with time and temperature but can also vary based on the modulated signal component. Current DC offset schemes fail to adequately address these variances when preparing a baseband signal for demodulation. For the reasons stated above and for other reasons stated below which will become apparent to those skilled in the art upon reading and understanding the specification, there is a need in the art for DC offset correction that accounts for these variations.

SUMMARY

The Embodiments of the present invention provide methods and systems for adaptable DC offset correction and will be understood by reading and studying the following specification.

In one embodiment, a method for reducing DC offset in a digital baseband signal is provided. The method comprises evaluating an incoming baseband signal to determine an expected DC offset characteristic; choosing an appropriate DC offset removal scheme based on the expected DC offset characteristic; removing a DC offset from the incoming baseband signal based on the chosen DC offset scheme; and outputting a reduced DC baseband signal.

In another embodiment, a computer-readable medium having computer-executable program instructions for a method for reducing DC offset in a digital baseband signal is provided. The method comprises evaluating an incoming baseband signal to determine an expected DC offset characteristic; selecting a scaling factor based on the expected DC offset characteristic; subtracting an estimated DC offset from the incoming baseband signal, wherein the estimated DC offset is determined by repeatedly summing a difference between the incoming baseband signal and a previously estimated DC offset, wherein the difference is multiplied by the scaling factor; and outputting a reduced DC baseband signal, wherein the reduced DC baseband signal is equal to the difference between the incoming baseband signal and an estimated DC offset.

In still another embodiment, a DC offset correction system is provided. The system comprises a data detector adapted to input an incoming baseband signal and based on the contents of the incoming baseband signal, output a selection signal that selects an appropriate DC offset removal scheme; and a DC offset removal module adapted to input the incoming baseband signal and subtract an estimated DC offset from the incoming baseband signal, wherein the DC offset removal module is adapted to estimate the DC offset by repeatedly summing a difference between the incoming baseband signal and a previously estimated DC offset, wherein the difference is multiplied by a scaling factor defined by the selected DC offset removal scheme.

In yet another embodiment, an adaptable DC offset correction system is provided. The system comprises means for evaluating an incoming baseband signal to determine an appropriate DC offset removal scheme; means for removing a DC offset from the incoming baseband signal based on the appropriate DC offset scheme, wherein the means for removing a DC offset is responsive to the means for evaluating an incoming baseband signal; and means for outputting a reduced DC baseband signal responsive to the means for removing DC offset from the incoming baseband signal.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the need for adaptable DC offset correction by applying different DC offset removal schemes based on the contents of the baseband signal. For example, a baseband signal may possess differing DC offset characteristics depending on whether or not the signal includes a modulated signal component. Removing the DC offset when a modulated signal is present is necessary to accurately demodulate the signal and reduce bit errors. Removing the DC offset when no modulated signal is present is necessary to increase the sensitivity of a demodulator to an incoming signal. In one embodiment, to address the different DC offset characteristics within a baseband signal, embodiments of the present invention apply different DC offset removal schemes to the baseband signal depending on whether there is a modulated signal component present. Similarly, baseband signals produced by different transmitters may possess different DC offset characteristics. In one embodiment, two or more alternate DC offset removal schemes are applied to a baseband signal based on the DC offset characteristics it is expected to possess.

Figure 1A:
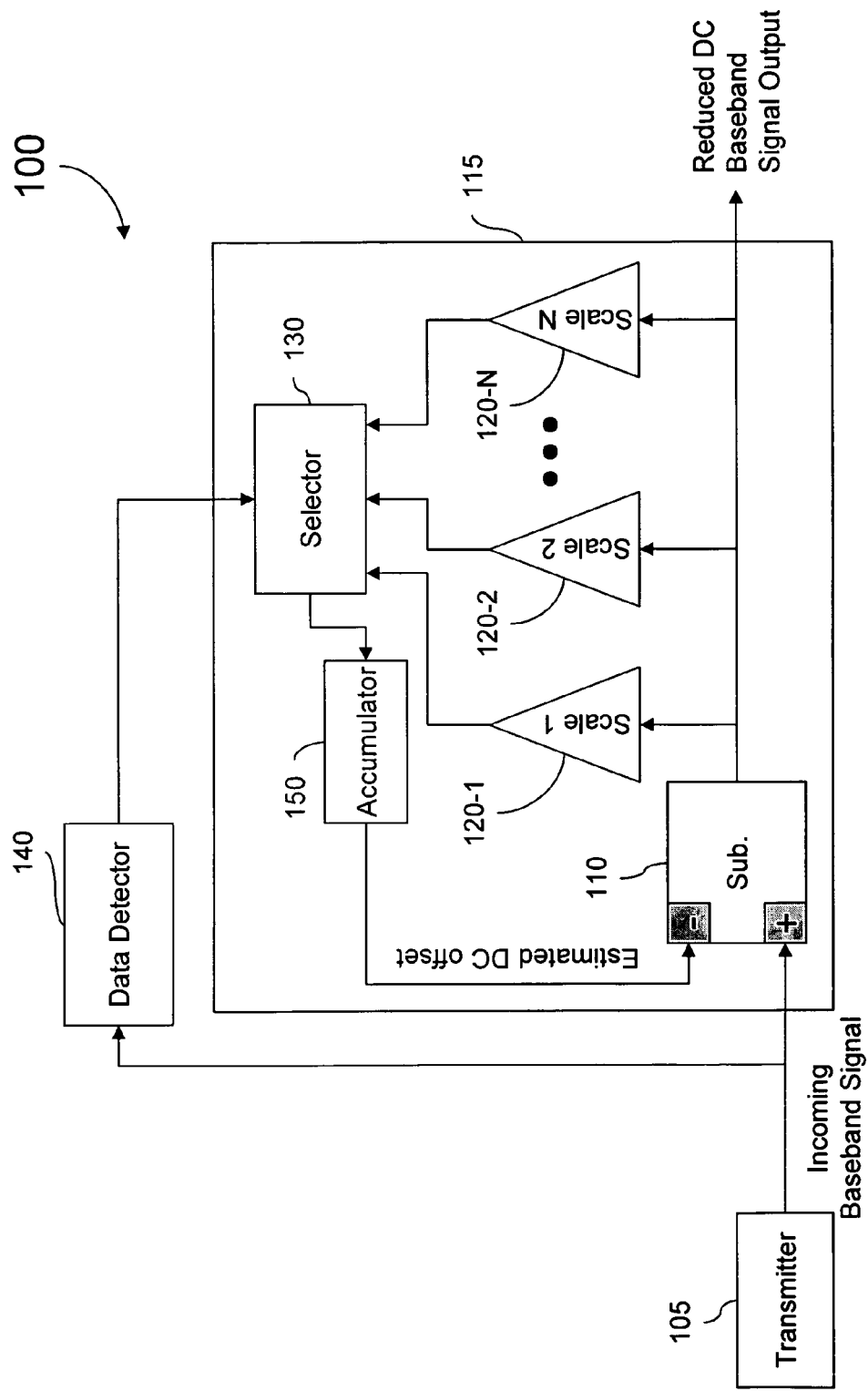
FIG. 1A is a diagram illustrating a system for reducing DC offsets of one embodiment of the present invention.

FIG. 1A is a block diagram illustrating an adaptable DC offset correction system 100 of one embodiment of the present invention. In one embodiment, DC offset correction system 100 comprises a DC offset removal module 115. In one embodiment, DC offset removal module 115 comprises a subtraction module (Sub.) 110 and a plurality of scaling modules (Scale 1-N) 120-1 to 120-N each coupled to receive the output of subtraction module 110. The output of subtraction module 110 represents the difference between an incoming baseband signal, and an estimated DC offset of the incoming baseband signal. Each of scaling modules 120-1 to 120-N multiplies the output of subtraction module 110 by a scaling factor and outputs the result as an offset error to a selector module 130. Based on a selection signal from a data detector 140, selector module 130 outputs the result from one of scaling modules 120-1 to 120-N to accumulator 150.

Accumulator 150 sums the output from selector module 130 with the sum of previous selector module 130 outputs. The resulting sum represents the estimated DC offset of the incoming baseband signal which is subtracted from the incoming baseband signal by subtraction module 110.

Upon receiving a baseband signal that comprises a DC offset, the output of subtraction module 110 will converge into a reduced DC baseband signal within a time period determined by the scaling factor of the scaling module 120-1 to 120-N selected by selector module 130. For example, where scaling module 120-1 has a scaling factor of $2^{-18}$ and scaling module 120-2 has a scaling factor of $2^{-21}$, the selection of scaling module 120-1 will result in DC offset correction system 100 converging on the reduced DC baseband signal faster than the selection of scaling module 120-2. In one embodiment, a data detector 140 also inputs the incoming baseband signal and based on the contents of the signal identifies which one of scaling modules 120-1 to 120-N provides the desired scaling factor. In one embodiment, data detector 140 selects a faster scaling factor (i.e., a scaling factor that provides a faster convergence) when a modulated signal component is present than when no modulated signal component is present. In one embodiment, data detector 140 selects a desired scaling factor based on the power level of transmitter 105. For example, in one embodiment, data detector 150 selects a faster scaling factor when transmitter 105 is transmitting at a higher power level and a relatively slower scaling factor when transmitter 105 is transmitting at a lower power level. In one embodiment, data detector 140 selects a desired scaling factor based on the transmitter 105 which generated the incoming baseband signal. For example, where a first transmitter type is known to generate baseband signals having a greater DC offset than a second transmitter type, then data detector 140 selects a faster scaling factor when receiving baseband signals from the first transmitter type than when receiving baseband signals from the second transmitter type. In one embodiment, data detector 140 determines which of one or more transmitters transmitted an incoming baseband signal from information, such as a transmitter ID code, transmitted within the incoming baseband signal.

Figure 1B:
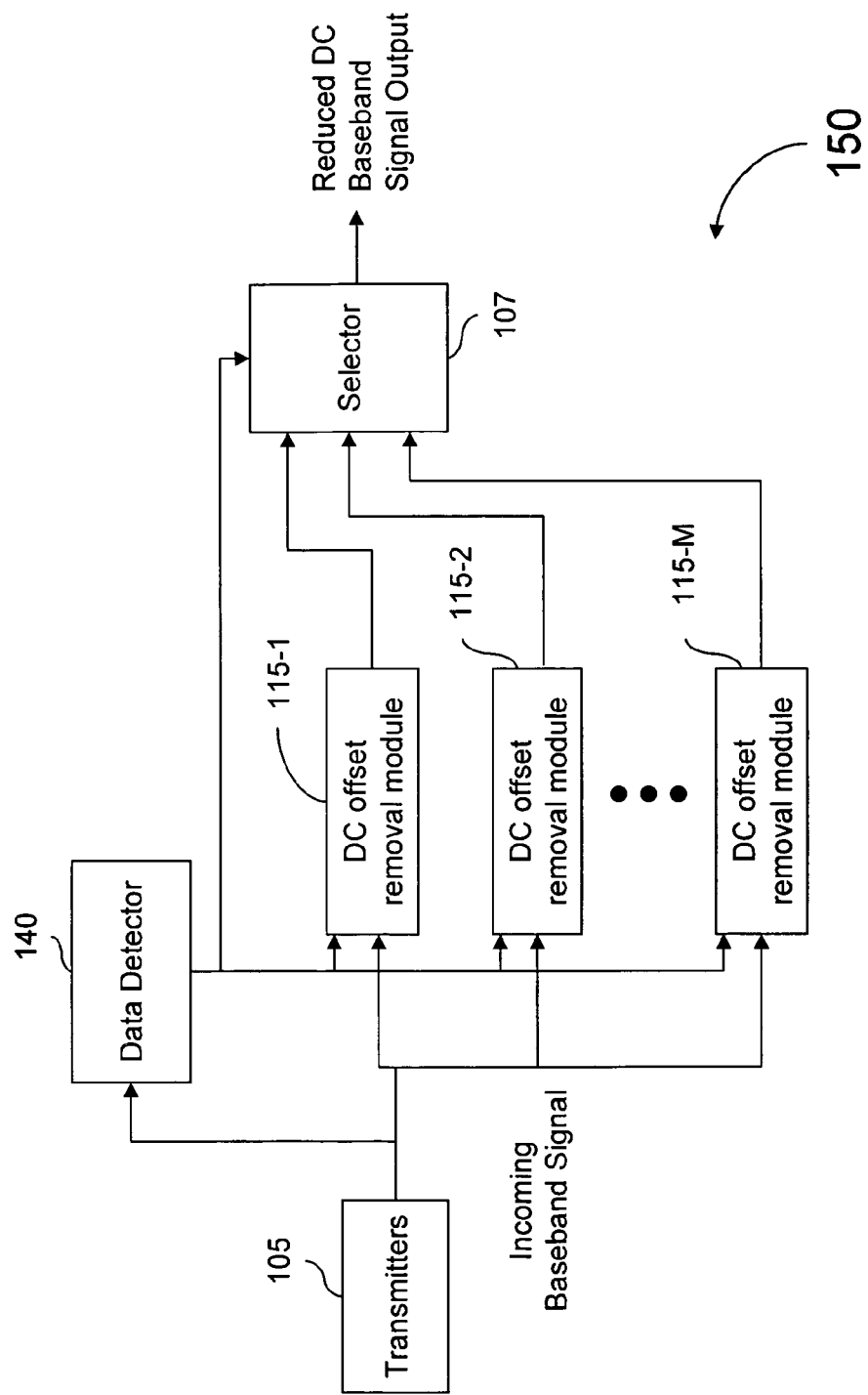
FIG. 1B is a diagram illustrating a system for reducing DC offsets of one embodiment of the present invention.

FIG. 1B is a block diagram illustrating an adaptable DC offset correction system 150 of one embodiment of the present invention. In one embodiment, DC offset correction system 150 comprises a plurality of DC offset removal modules 115-1 to 115-M, each having the limitations of DC offset removal module 115 discussed with respect to FIG. 1A, and each coupled to output a reduced DC baseband signal to selector 107. As described with respect to FIG. 1A, data detector 140 inputs an incoming baseband signal produced by one of one or more transmitters 106. In one embodiment, based on the contents of the signal, data detector 140 selects both of one of the plurality of DC offset removal modules 115-1 to 115-M to process the signal and further identifies which one of scaling modules 120-1 to 120-N within the one of the plurality of DC offset removal modules 115-1 to 115-M provides the desired scaling factor.

For example, in one embodiment in operation, data detector 140 determines that a first transmitter of transmitters 105 is transmitting an incoming baseband signal and based on that determination selects DC offset removal module 115-1 to perform the DC offset reduction for the signal. Data detector 105 outputs a selection signal to selector 107 causing selector 107 to output a reduced DC baseband signal based on the output of DC offset removal module 115-1. In addition, the selection signal from data detector 140 further indicates to DC offset removal module 115-1 which of scaling modules 120-1 to 120-N provides the desired scaling factor for the incoming baseband signal, as described with respect to FIG. 1A above. In one embodiment, when the selector signal from data detector 140 indicates the selection of a scaling module from DC offset removal module 115-1, DC offset removal modules 115-2 to 115-M ignore the incoming baseband signal. In one embodiment, DC offset removal modules 115-1 to 115-M each ignore the incoming baseband signal by selecting a scaling module with a zero scaling factor when a selector signal from data detector 140 indicates the selection of a scaling module they do not possess.

Figure 2:
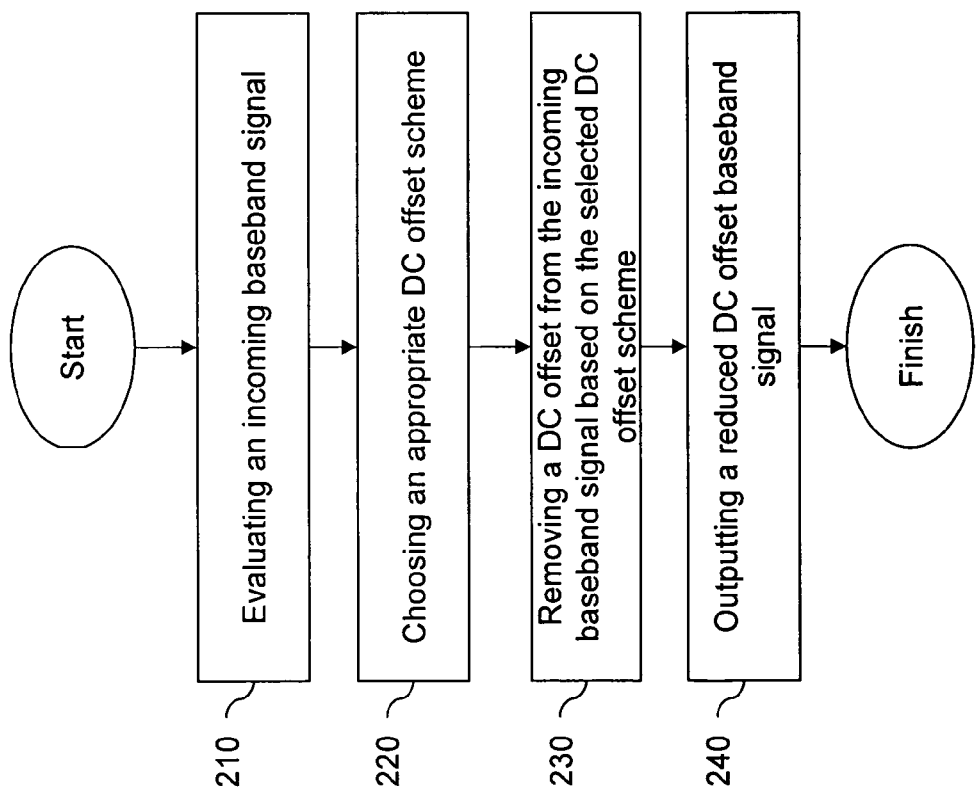
FIG. 2 is a flow chart illustrating a method for reducing DC offsets of one embodiment of the present invention.

FIG. 2 is a flow chart illustrating a method for practicing one embodiment of the present invention. The method starts at 210 with evaluating an incoming baseband signal. In one embodiment, evaluating an incoming baseband signal comprises determining whether or not the baseband signal includes a modulated signal component. In one embodiment, evaluating an incoming baseband signal comprises determining which of one or more of transmitters produced the incoming baseband signal. This evaluation serves to identify the expected DC offset characteristics of the baseband signal. Based on the expected DC offset characteristics of the incoming baseband signal, the method continues to 220 with choosing the appropriate DC offset removal scheme. In one embodiment, a faster DC offset removal scheme is selected for a baseband signal that includes a modulated signal component than for a baseband signal that does not include a modulated signal component. The method then proceeds to 230 with removing DC offset from the incoming baseband signal based on the selected DC offset scheme. In one embodiment, the selected DC offset scheme comprises subtracting an estimated DC offset from the incoming baseband signal to converge on a reduced DC baseband signal. In one embodiment, the estimated DC offset is determined by repeatedly summing the difference between the incoming baseband signal and a previously estimated DC offset, wherein the difference is multiplied by a scaling factor. The method the proceeds to 240 with outputting a reduced DC baseband signal. In one embodiment, the reduced DC baseband signal is equal to the difference between the incoming baseband signal and an estimated DC offset.

Several means are available to implement the DC offset correction system and methods discussed with respect to the current invention. These means include, but are not limited to, digital computer systems, programmable controllers, or field programmable gate arrays. Therefore other embodiments of the present invention are program instructions resident on computer readable media which when implemented by such processors, enable the processors to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for reducing DC offset in a digital baseband signal, the method comprising:
    evaluating an incoming baseband signal to determine an expected DC offset characteristic;
    choosing a DC offset removal scheme from a plurality of DC offset removal schemes based on the expected DC offset characteristic, wherein the plurality of DC offset removal schemes has at least a first DC offset removal scheme that converges on a reduced DC baseband signal faster than a second DC offset removal scheme;
    removing a DC offset from the incoming baseband signal based on the chosen DC offset scheme; and
    outputting a reduced DC baseband signal.

2. The method of claim 1, wherein evaluating the incoming baseband signal comprises:
    determining one or more of whether or not the incoming baseband signal includes a modulated signal component, a power level of the incoming baseband signal, and which of one or more transmitters generated the incoming baseband signal.

3. The method of claim 1, wherein choosing the DC offset removal scheme comprises:
    selecting a first DC offset removal scheme when the incoming baseband signal includes a modulated signal component; and
    selecting the second DC offset removal scheme when the incoming baseband signal does not include a modulated signal component.

4. The method of claim 1, wherein choosing the DC offset removal scheme further comprises:
    selecting the first DC offset removal scheme when the incoming baseband signal includes a first DC offset that is larger than a second DC offset.

5. The method of claim 1, wherein the chosen DC offset removal scheme comprises:
    subtracting an estimated DC offset from the incoming baseband signal, wherein the estimated DC offset is determined by repeatedly summing a difference between the incoming baseband signal and a previously estimated DC offset, wherein the difference is multiplied by a scaling factor defined by the appropriate DC offset removal scheme; and
    converging on a reduced DC baseband signal, wherein the reduced DC baseband signal is equal to the difference between the incoming baseband signal and the estimated DC offset.

6. A computer-readable medium having computer-executable program instructions for reducing DC offset in a digital baseband signal, comprising:
    evaluating an incoming baseband signal to determine an expected DC offset characteristic;
    selecting a scaling factor from a plurality of scaling factors based on the expected DC offset characteristic, wherein the plurality of scaling factors has at least a first scaling factor that converges on a reduced DC baseband signal faster than a second scaling factor;
    subtracting an estimated DC offset from the incoming baseband signal, wherein the estimated DC offset is determined by repeatedly summing a difference between the incoming baseband signal and a previously estimated DC offset, wherein the difference is multiplied by the scaling factor; and
    outputting a reduced DC baseband signal, wherein the reduced DC baseband signal is equal to the difference between the incoming baseband signal and an estimated DC offset.

7. The computer-readable medium of claim 6, wherein evaluating an incoming baseband further comprises:
    determining one or more of whether or not the incoming baseband signal includes a modulated signal component, the power level of the incoming baseband signal, and which of one or more transmitters generated the incoming baseband signal.

8. The computer-readable medium of claim 6, wherein choosing an appropriate DC offset removal scheme further comprises:
    selecting a first scaling factor when the incoming baseband signal includes a modulated signal component; and
    selecting a second scaling factor when the baseband signal comprises a smaller DC offset.

9. A DC offset correction system, the system comprising:
    a data detector adapted to input an incoming baseband signal and based on the contents of the incoming baseband signal, output a selection signal that selects an appropriate DC offset removal scheme; and
    at least one DC offset removal module adapted to input the incoming baseband signal and subtract an estimated DC offset from the incoming baseband signal, wherein the at least one DC offset removal module is adapted to estimate the DC offset by repeatedly summing a difference between the incoming baseband signal and a previously estimated DC offset, wherein the difference is multiplied by a scaling factor defined by the selected DC offset removal scheme, and wherein the at least one DC offset removal module further comprises a plurality of DC offset removal modules, and wherein the selection identifies a first DC offset removal module of the plurality of DC offset removal modules.

10. The system of claim 9, the at least one DC offset removal module further comprising:
    a subtraction module adapted to input the incoming baseband signal and output the difference between the incoming baseband signal and the estimated DC offset;
    a plurality of scaling modules coupled to received the output of the subtraction module, wherein each scaling module is adapted to scale the output of the subtraction module by one of a plurality of scaling factors, wherein each scaling module outputs an offset error based on the scaled output of the subtraction module;
    a selector module coupled to receive the output of each of the plurality of scaling modules, the selector module adapted to output the offset error of one of the plurality of scaling modules based on the incoming baseband signal; and an accumulator adapted to sum the output of the selector module with one or more previous outputs of the selector module and output the sum as the estimated DC offset.

11. The system of claim 10, wherein the selection signal identifies one of the plurality of scaling modules; and wherein the selector module is further adapted to input the selection signal, wherein the selector module is further adapted to output the offset error of one of the plurality of scaling modules based on the one of the plurality of scaling modules identified by the selection signal.

12. The system of claim 11 wherein the selector module outputs an offset error from a first scaling module having a faster scaling factor than a second scaling module when the incoming baseband signal comprises a modulated signal component.

13. The system of claim 11 wherein the selector module outputs an offset error from a first scaling module having a faster scaling factor than a second scaling module when the incoming baseband signal comprises a first DC offset that is larger than a second D offset.

14. The system of claim 9, wherein the data detector outputs the selection signal based on one or more of whether the incoming baseband signal comprises a modulated signal component, whether the incoming baseband signal does not comprise a modulated signal component, the power level of the incoming baseband signal, and the transmitter that generated the incoming baseband signal.

15. An adaptable DC offset correction system, the system comprising:

means for evaluating an incoming baseband signal to determine an appropriate DC offset removal scheme, wherein the means for evaluating an incoming baseband signal selects a first DC offset removal scheme that converges on the reduced DC baseband signal faster than a second DC offset removal scheme when the incoming baseband signal includes a modulated signal component;

means for removing a DC offset from the incoming baseband signal based on the appropriate DC offset scheme, wherein the means for removing a DC offset is responsive to the means for evaluating an incoming baseband signal; and means for outputting a reduced DC baseband signal responsive to the means for removing DC offset from the incoming baseband signal.

16. The system of claim 15, wherein the means for evaluation of an incoming baseband signal further comprises:

means for determining one or more of whether or not the incoming baseband signal includes a modulated signal component, the power level of the incoming baseband signal, and which of one or more transmitters generated the incoming baseband signal.

17. The system of claim 15, wherein the means for removing DC offset from the incoming baseband signal further comprises:

means for subtracting an estimated DC offset from the incoming baseband signal, wherein the estimated DC offset is determined by repeatedly summing a difference between the incoming baseband signal and a previously estimated DC offset, wherein the difference is multiplied by a scaling factor defined by the appropriate DC offset removal scheme; and wherein the reduced DC baseband signal is equal to the difference between the incoming baseband signal and the estimated DC offset.

18. The system of claim 15, wherein the means for evaluating an incoming baseband signal selects a first DC offset removal scheme that converges on the reduced DC baseband signal faster than a second DC offset removal scheme when the incoming baseband signal includes a first DC offset that is larger than a second DC offset.

* * * * *